United States Patent [19]

Nishikawa et al.

[11] 4,000,785
[45] Jan. 4, 1977

[54] POWER STEERING APPARATUS FOR A VEHICLE

[75] Inventors: Masao Nishikawa, Niiza; Yoshihiko Toshimitsu; Takashi Aoki, both of Asaka, all of Japan

[73] Assignee: Honda Giken Kogyo Kabushiki Kaisha, Tokyo, Japan

[22] Filed: Aug. 6, 1975

[21] Appl. No.: 602,518

[30] Foreign Application Priority Data

Aug. 7, 1974 Japan .................. 49-89811

[52] U.S. Cl. ........................... 180/143; 91/434
[51] Int. Cl.² ........................... B62D 5/08
[58] Field of Search ............ 180/79.2 R, 143, 141, 180/142; 91/434, 371, 372

[56] References Cited

UNITED STATES PATENTS

| | | | |
|---|---|---|---|
| 2,893,504 | 7/1959 | Jackson | 180/79.2 R |
| 3,677,140 | 7/1972 | Brown | 91/434 |
| 3,692,137 | 9/1972 | Inoue | 180/79.2 R |

OTHER PUBLICATIONS

B310,149, Jan. 1975, Sugisawa, 180/143.

Primary Examiner—Joseph F. Peters
Assistant Examiner—John A. Pekar

[57] ABSTRACT

Power steering apparatus comprising a displaceable changeover value operated in one direction or the other by turning of a steering shaft so that an oil supply passage connected to an oil pressure pump is placed into communication with either a right chamber or a left chamber of a power cylinder. At least one external oil pressure reaction chamber is arranged to be reduced in volume by the operation in either direction of the changeover valve, the oil pressure reaction chamber being in communication through a first throttle with the oil supply passage and through a second throttle with an exterior oil tank. At least one of the two throttles is variable in size in proportion to vehicle speed so that the ratio of the area of opening of the first throttle relative to the second throttle can be increased according to increase of vehicle speed.

4 Claims, 4 Drawing Figures

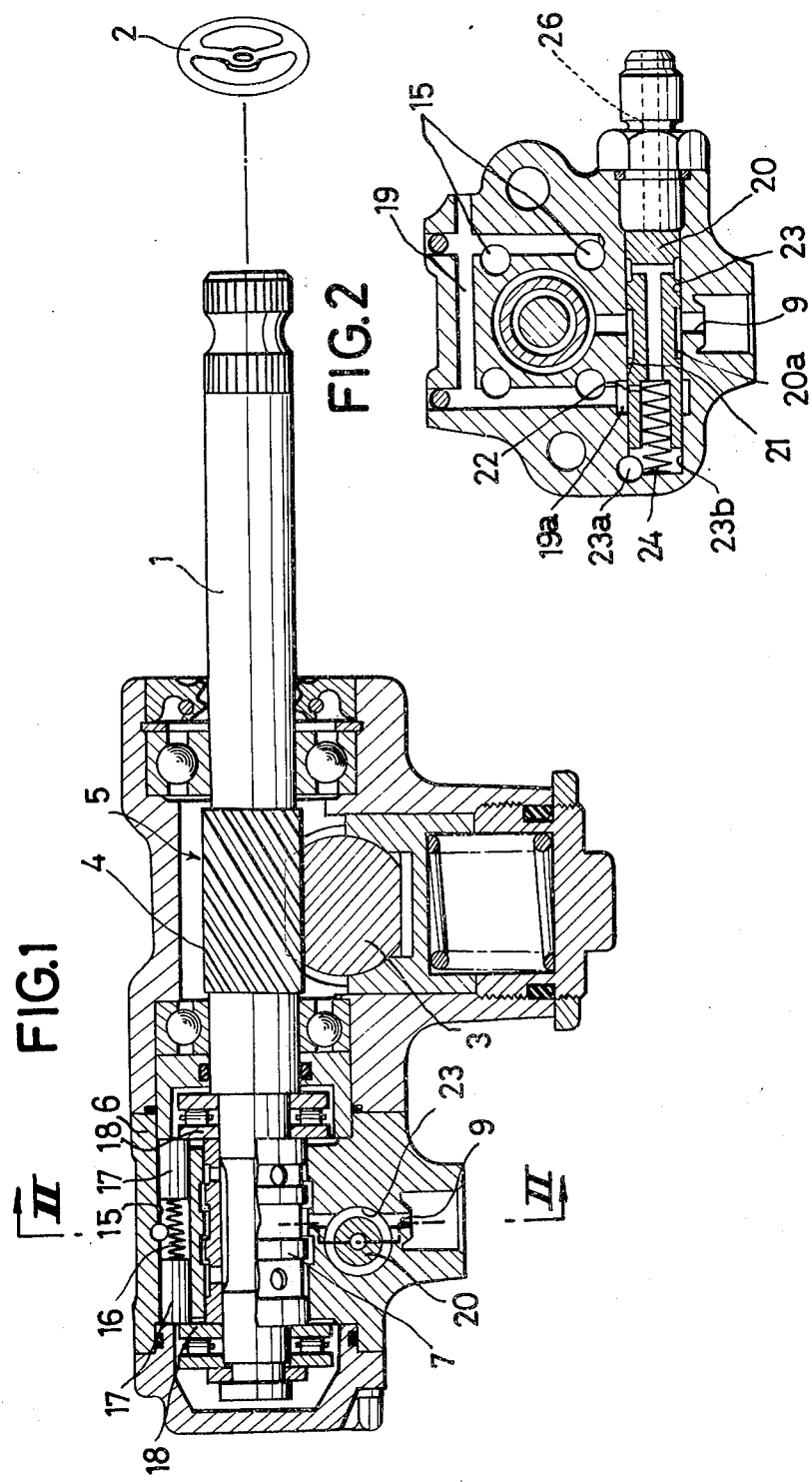

POWER STEERING APPARATUS FOR A VEHICLE

FIELD OF THE INVENTION

This invention relates to power steering apparatus for a vehicle, such as, a motorcar.

PRIOR ART

In known apparatus of this type, a changeover valve is operated in one direction or the other by turning of the steering shaft so that an oil supply passage connected to an operation oil pressure source, such as an oil pressure pump or the like, may be in communication selectively with a right chamber or a left chamber of a power cylinder, at least one oil pressure reaction chamber is placed externally of the power cylinder and is arranged to be reduced in volume by the operation in either direction of the changeover valve, the oil pressure reaction chamber being in communication at its interior with the foregoing oil supply passage so as to produce therein an oil pressure reaction force corresponding to road surface resistance. As a result, the steering force applied to the steering wheel by the driver is subjected to a reaction force corresponding to road surface resistance and, accordingly, the steering angle is correlated therewith, and it serves advantageously for safety in steering of the vehicle.

With this arrangement, however, the proportion coefficient between the steering force and the road surface resistance is always constant regardless of vehicle speed. Accordingly, if in order to prevent oversteering in high speed driving, the proportion coefficient is made large, there is produced the disadvantage that the driver must effect wasted steering effort in the case of stoppage or low speed of the vehicle. If, in contrast thereto, for facilitating the steering at low vehicle speeds, the proportion coefficient is made small, oversteering in the case of high speed driving can not be avoided. Thus, the setting of the proportion coefficient is a very difficult problem.

SUMMARY OF THE INVENTION

An object of this invention is to provide an apparatus which is free from such disadvantages.

According to this invention, in apparatus of the type in which a changeover valve is operated in one direction or the other by turning of a steering shaft so that the oil supply passage connected to the operation oil pressure source such as the oil pressure pump or the like may be in communication with either the right chamber or the left chamber of the power cylinder, and wherein at least one external oil pressure reaction chamber is arranged to be reduced in its volume by the operation in either direction of the changeover valve, the apparatus is characterized in that the oil pressure reaction chamber is in communication, through a first throttle means with the foregoing oil supply passage and, through a second throttle means with an exterior oil tank, and at least one of the two throttle means is constructed to be variable in proportion to vehicle speed to that the ratio of the area of the opening of the first throttle means relative to the second throttle means may be increased according to increase of the vehicle speed.

BRIEF DESCRIPTION OF THE DRAWING

FIG. 1 is a sectional side view of one embodiment of apparatus according to this invention;

FIG. 2 is a sectional view taken along line II—II in FIG. 1;

DETAILED DESCRIPTION

Figure 3:
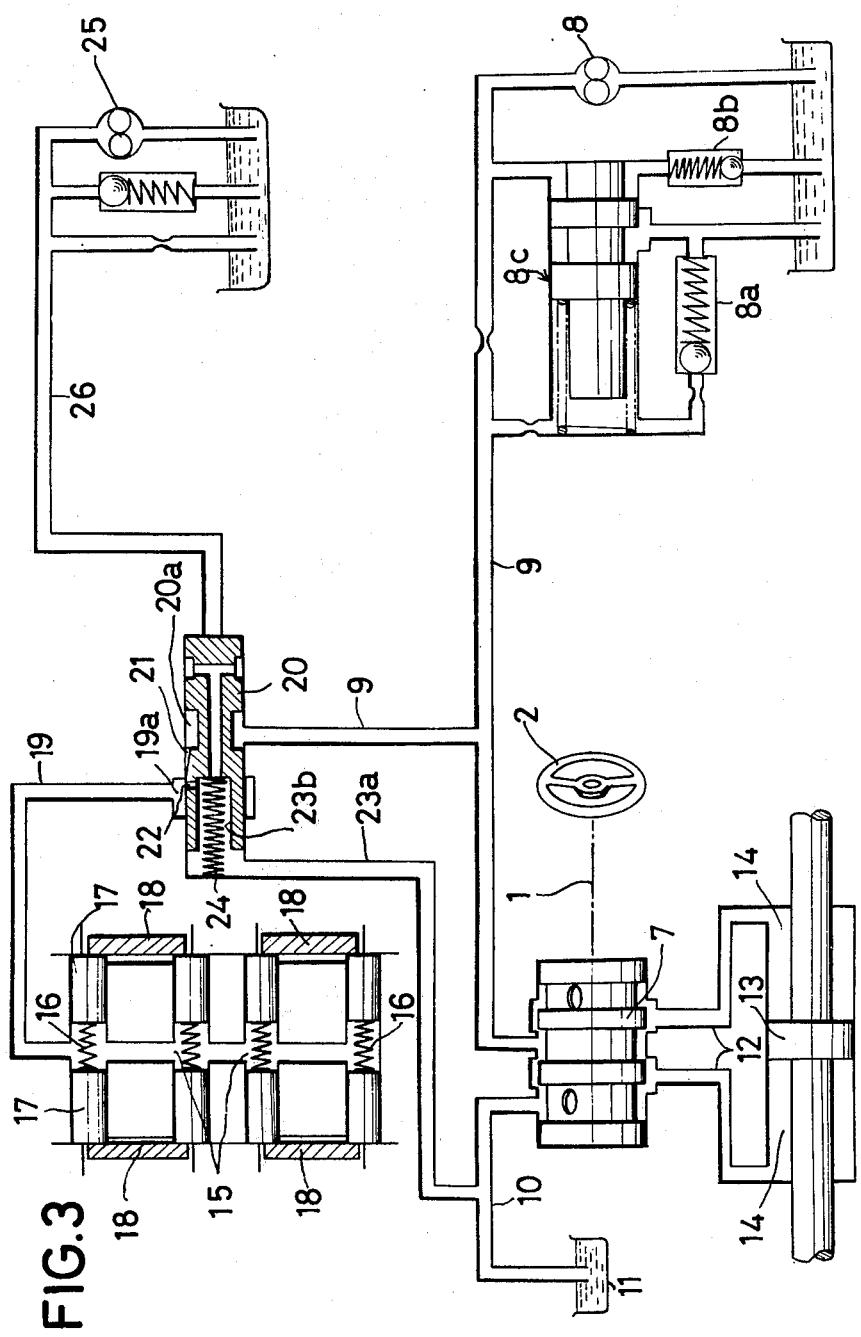
FIG. 3 is a diagrammatic illustration showing an oil pressure circuit of the apparatus.

Referring to the drawings, numeral 1 denotes a steering shaft of a vehicle and numeral 2 denotes a steering wheel mounted on the rear end thereof. The steering shaft 1 is extended forwards and forms, in succession, a pinion shaft 5, which is rotatable therewith and has a spiral pinion 4 in mesh with a spiral type rack 3 mounted on one side thereof, and a changeover valve 7 which is slidable either forwards or rearwards within a valve housing 6 by the action of a longitudinal reaction force acting on the pinion shaft 5 on turning of the spiral pinion 4.

The changeover valve 7 is of a center open type, and operates in such a manner that in the ordinary case, pressure oil supplied through a oil supply passage 9 from an oil pressure source 8 comprising an oil pressure pump driven by an external engine is allowed to pass therethrough, as is, for being returned from an exhaust passage 10 to an oil tank 11. In such a condition, no pressure is generated in the supply oil passage 9. By forward or rearward sliding movement of the changeover valve 7, the pressure oil is supplied to one or the other of opposite chambers 14, of a power cylinder through either of a pair of discharge passages 12, so as to give a predetermined power assistance to the manual steering operation. Thus there is obtained a condition in which a pressure corresponding to road surface resistance is generated in the chamber 14 and accordingly, in the supply oil passage 9.

Numeral 8a denotes a relief valve for preventing excessive pressure rise and numeral 8b denotes a check valve for preventing negative pressure. Numeral 8c denotes a flow rate control valve for keeping constant the delivery amount of pressure oil delivered into the supply oil passage 9 from the operation oil pressure source 8.

Numeral 15 denotes an oil pressure reaction chamber which is provided on one side of the changeover valve 7 so as to be reduced in volume by either forward or rearward movements of the valve 7, and a pair of front and rear plungers 17 urged away from one another by a spring 16 are provided within the oil pressure reaction chamber 15. The plungers 17 are held between a pair of front and rear flanges 18 projecting from the changeover valve 7. In the illustrated embodiment, four such oil pressure reaction chambers 15 are provided and these are in communication one with another through an oil passage 19.

End 19a of the oil passage 19 is in communication with the foregoing supply oil passage 9 through a first throttle 21 provided in a control valve 20 and end 19a is in communication with the oil tank 11 through a second throttle 22 also provided in the control valve 20. The control valve 20 is slidably mounted within a valve chamber 23 having on one side thereof an outlet connected to end 19a of the oil passage 19 and on the other side thereof an inlet connected to the supply oil passage 9. The valve 20 is urged to the right by a spring 24 within an oil pressure chamber 23b connected to the oil tank 11 through an oil passage 23a. The chamber 23 is connected at its other end through an oil passage 26 to an exterior control oil pressure source 25 which generates an oil pressure corresponding to vehicle speed and comprises, for instance, an oil pressure pump driven by a counter shaft or the like of the vehicle, and thus it is so operated that the valve 20 may be moved to the left against the action of the spring 24 as the vehicle speed increases. Additionally, the valve 20 is provided at its center with an outer annular groove 20a which is always in communication with the inlet to passage 9 and there is formed at one edge portion of this groove 20a a slant cutout which extends obliquely towards the outlet at 19a so that the cutout serves as the foregoing first throttle 21. A small opening communicating between the interior of the oil chamber 23b and the outlet 19a serves as the second throttle 22.

Thus, if the control valve 20 is moved to the left as the vehicle speed increases, the area of opening of the first throttle 21 with the end 19a is increased in accordance therewith, while the opening area of the second throttle 22 does not change. Thereby, the ratio of the area of opening of the first throttle relative to the second throttle increases according to increase of the vehicle speed.

Further, the first throttle 21 is so designed that, when the vehicle speed is zero (the condition illustrated in the drawing), the groove 20a and accordingly the supply oil passage 9 connected thereto are not in communication with the foregoing end 19a.

Figure 4:
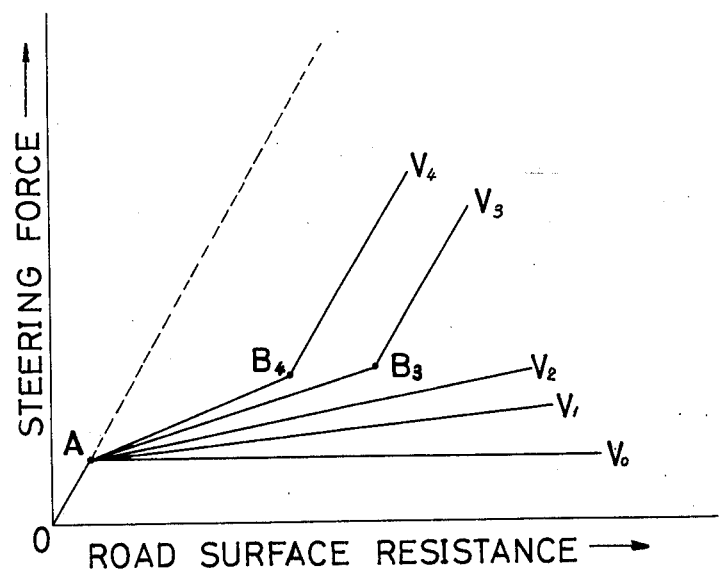
FIG. 4 is a graph showing the steering characteristic of the apparatus.

The operation of the apparatus will next be given as follows:

When the vehicle speed is zero, that is, $V_0$, no oil pressure is generated at the control oil pressure source 25, so that the control valve 20 is kept in the illustrated position by the force of the spring 24, and the oil passage 19 and, accordingly, the oil pressure reaction chamber 15 connected thereto is cut off from communication with the supply oil passage 9. If, in this condition, the steering shaft 1 is turned in one direction, the pinion shaft 5 rotates therewith and a longitudinal reaction force acting on the pinion shaft 5 serves to slidably move the changeover valve 7 in one direction against the action of the spring 16 within the oil pressure reaction chamber, whereby one side chamber 14 of the power cylinder 13 is brought into communication with the operation oil pressure source 8 and thus the manual steering operation is given a power assistance. At this time, an oil pressure corresponding to the road surface resistance is generated in the chamber 14 and the supply oil passage 9 as mentioned before, but because the oil pressure reaction chamber 15 is not in communication with the supply oil passage 9, as mentioned before, this oil pressure does not act on the oil pressure reaction chamber 15. Accordingly, the steering force does not increase above a value determined by the strength of the spring 16 within the oil pressure reaction chamber 15. Thus, the change of the steering force has the characteristic curve shown by $O - A - V_0$ in FIG. 4. Here, the bend point A is determined by the strength of the spring 16 within the chamber 15.

When, next, a steering is effected at a vehicle speed $V_1$, an oil pressure corresponding to the vehicle speed $V_1$ is generated at the control oil pressure source 25 and the control valve 20 is moved to the left in accordance therewith and the first throttle 21 is put into communication between the oil passage 19 and the groove 20a and accordingly the supply oil passage 9 connected thereto. Thus, the oil pressure reaction chamber 15 is supplied with pressure oil through the first throttle 21 from the supply oil passage 9 and the oil pressure therein is raised. However, in accordance with this increase in the oil pressure, the amount of oil discharged through the second throttle 22 to the oil tank 11 is also increased, and thereby the oil pressure within the oil pressure reaction chamber 15 is automatically set to be such an oil pressure that the amount of oil supplied through the first throttle 21 is equal to the amount of oil discharged through the second throttle 22.

This can be expressed by the following formula:

$$S_1 \sqrt{P - P'} = S_2 \sqrt{P'}$$
$$P' = \frac{S_1^2}{S_1^2 + S_2^2} P = \frac{1}{(S_2/S_1)^2 + 1} P \quad (1)$$

Here, $S_1$ is the opening area of the first throttle 21, $S_2$ is the opening area of the second throttle 22, $P$ is the oil pressure within the supply oil passage 9 and $P'$ is the oil pressure within the oil pressure reaction chamber 15. The formula (1) shows that the oil pressure $P'$ within the oil pressure reaction chamber 15 is increased in relation to the increase of the oil pressure $P$ within the supply oil passage 9 according to the road surface resistance, keeping a proportional relationship determined by $$\frac{1}{(S_2/S_1)^2 + 1}.$$

The oil pressure $P'$ within the oil pressure reaction chamber 15 acts as a load on the steering force, so that the steering characteristic curve becomes $O - A - V_1$.

If the vehicle speed increases to $V_2$, the control valve 20 is moved further to the left and the opening area $S_1$ of the first throttle 21 is increased in proportion thereto. Meanwhile, the opening area $S_2$ of the second throttle 22 is unchanged, so that the ratio of the opening areas $S_1/S_2$ of the first throttle 21 to the second throttle 22 becomes larger than that in the case of vehicle speed $V_1$, and thus the proportion coefficient $$\frac{1}{(S_2/S_1)^2 + 1}$$

in the formula (1) is increased, and the steering characteristic curve in this case becomes $O - A - V_2$.

If the vehicle speed is further increased to become $V_3$, the opening area $S_1$ of the first throttle 21 is further increased and the proportion coefficient between the steering force and the road surface resistance is further increased. With such increase of the opening area $S_1$ of the first throttle 21, the first throttle 21 gradually loses its throttle action and passing of the pressure oil within the supply oil passage 9 through the first throttle 21 becomes easier and accordingly discharge thereof to the oil tank 11 through the second throttle 22 becomes easier. If, under this condition, the oil pressure within the supply oil passage 9 reaches a predetermined high pressure with increase of the road surface resistance, the amount of the oil discharged through the two throttles 21, 22 reaches a predetermined large amount and this amount becomes equal to the delivery amount of oil delivered from the operation oil pressure source 8. Thus, there is obtained such a condition that the oil pressure within the supply oil passage 9 cannot be raised. Under this condition, for the road surface resistance exceeding a power assistance corresponding to this oil pressure, steering must be effected manually. Thus, the steering characteristic curve comes to be O — A — $B_3$ — $V_3$. Here, the point $B_3$ is determined by the upper limit value of the oil pressure increase within the supply oil passage 9. Within the range above the point $V_3$, the proportion coefficient of the steering force to the road surface resistance becomes a value determined by a gear ratio in a manual steering operation, and this means that the steering force becomes suddenly large within the range of large road surface resistance and accordingly for large steering angles at which oversteering is liable to be caused, and it serves effectively to prevent oversteering during high speed driving.

When steering is effected at a high speed $V_4$, the proportion coefficient between the steering force and the road surface resistance is further increased and, at the same time, by increasing of the opening area $S_1$ of the first throttle 21, the discharge of the oil pressure within the supply oil passage 9 is further facilitated as compared to the case of the vehicle speed $V_3$ and the upper limit value is lowered, and the steering characteristic curve becomes O — A — $B_4$ — $V_4$. Here, the steering force becomes large rapidly at a point where the road surface resistance is smaller and accordingly, the steering angle is smaller than that in the case of vehicle speed $V_3$, and this is advantageous because oversteering is liable to be caused even for small steering angles if the vehicle speed is increased.

In the foregoing embodiment, the first throttle 21 is formed integrally with the control valve 20 which is movable in proportion to the vehicle speed so that the opening area of the first throttle 21 may be increased according to vehicle speed by movement of the control valve 20. However, the means for varying the opening area $S_1$ of the first throttle 21 is not limited thereto, and such a means, for instance, can be considered in which a weight is rotated at a speed corresponding to vehicle speed by means of a counter shaft or the like and by utilizing the centrifugal force thereof a needle valve can be advanced or retracted for varying the opening area.

If, instead of varying the opening area $S_1$ of the first throttle 21, the opening area $S_2$ of the second throttle 22 is arranged to be decreased according to vehicle speed, the ratio of the opening areas of the first throttle 21 and the second throttle 22 can be increased according to vehicle speed and thus the same objective as above can be achieved. Further, similar steering characteristics can be obtained by increasing the opening area $S_1$ of the first throttle 21 according to vehicle speed while at the same time reducing the opening area $S_2$ of the second throttle 22 according to vehicle speed.

Furthermore, the foregoing embodiment is directed to the case in which there is used a changeover valve of the type which is moved forwards and rearwards by turning of a steering shaft, but the invention is not limited thereto and there can be used such type of changeover valve which is rotated by turning of the steering shaft.

Thus, according to this invention, the proportion coefficient between the steering force and the road surface resistance is increased as the vehicle speed increases, and thus, during high speed driving, a very large steering force is required at the time when the road surface resistance (and, accordingly, the steering angle having a strong correlation therewith) is increased, and thereby oversteering can be positively prevented, while additionally, during low speed driving, the proportion coefficient becomes small and steering can be effected with a light steering force, and there can be produced a safe, reliable and effective power steering apparatus.

What is claimed is:
1. Power steering apparatus comprising a turnable steering shaft, a pressure fluid source, a power cylinder having left and right chambers, a supply passage connected to said source, movable changeover valve means coupled to said steering shaft for selectively connecting the left and right chambers to said passage and thereby to said source depending on the direction of turning of the steering shaft, at least one fluid pressure reaction chamber, a further passage connecting said reaction chamber to said changeover valve means for opposing displacement of the changeover valve means, first throttle means between said further passage to said fluid pressure reaction chamber and said supply passage, an exterior oil tank, second throttle means between said passage to said fluid pressure reaction chamber and said exterior oil tank, and control means for varying the size of at least one of said throttle means in proportion to vehicle speed thereby to increase the ratio of the size of the opening areas of the first and second throttle means to said further passage according to increase of vehicle speed, said control means comprising a linearly displaceable control valve, one of said throttle means being constituted as a variable area passage formed in said control valve, the other of said throttle means being constituted as a constant area passage formed in said control valve, said control means further comprising a pump having a delivery pressure corresponding to vehicle speed for moving said control valve in accordance with vehicle speed, thereby to vary the ratio of the sizes of said first and second throttle means to said further passage.

2. Power steering apparatus as claimed in claim 1 wherein said variable area passage is constituted by an oblique cut-out at the periphery of the control valve.

3. Power steering apparatus as claimed in claim 2 wherein said constant area passage is constituted by a bore of uniform diameter in said control valve.

4. Power steering apparatus as claimed in claim 3 wherein said further passage has an end communicating with said bore in said control valve, said cut-out at the periphery of the control valve progressively overlapping said end to increase the flow path from said supply passage to said further passage with increased vehicle speed.

* * * * *